United States Patent
Clayton et al.

(10) Patent No.: US 7,167,767 B2
(45) Date of Patent: Jan. 23, 2007

(54) GLASS PRODUCTION SEQUENCING

(75) Inventors: Byron Clayton, Chagrin Falls, OH (US); Paul Dorsch, Warren, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 377 days.

(21) Appl. No.: 10/751,382

(22) Filed: Jan. 5, 2004

(65) Prior Publication Data
US 2005/0043838 A1 Feb. 24, 2005

Related U.S. Application Data

(63) Continuation-in-part of application No. 10/646,191, filed on Aug. 22, 2003, now abandoned.

(51) Int. Cl.
*G06F 19/00* (2006.01)
(52) U.S. Cl. ...................................... 700/100; 700/157
(58) Field of Classification Search .......... 700/99–102, 700/157, 158; 65/29.12, 29.16, 160
See application file for complete search history.

(56) References Cited

U.S. PATENT DOCUMENTS

| | | | | |
|---|---|---|---|---|
| 5,373,451 A | * | 12/1994 | Furukawa | 700/228 |
| 5,446,671 A | * | 8/1995 | Weaver et al. | 700/100 |
| 5,573,618 A | * | 11/1996 | Rueckheim | 156/104 |
| 5,612,886 A | * | 3/1997 | Weng | 700/101 |
| 5,880,960 A | * | 3/1999 | Lin et al. | 700/99 |
| 6,294,044 B1 | * | 9/2001 | Schwaiger et al. | 156/304.2 |
| 6,353,769 B1 | * | 3/2002 | Lin | 700/101 |
| 6,546,364 B1 | * | 4/2003 | Smirnov et al. | 703/22 |
| 6,615,097 B1 | * | 9/2003 | Ozaki | 700/121 |
| 6,647,307 B1 | * | 11/2003 | Huang et al. | 700/102 |
| 6,757,577 B1 | * | 6/2004 | Jeng et al. | 700/99 |
| 6,782,295 B1 | * | 8/2004 | Martz et al. | 700/28 |
| 6,816,746 B1 | * | 11/2004 | Bickley et al. | 700/99 |

OTHER PUBLICATIONS

Brochure distributed at the GlassBuild America Show held in Atlanta, GA between Mar. 12 and 14, 2003. 1 page.

* cited by examiner

*Primary Examiner*—Maria N. Von Buhr
(74) *Attorney, Agent, or Firm*—Tarolli, Sundheim, Covell & Tummino LLP

(57) ABSTRACT

A method and apparatus for controlling production run sequences of insulating glass units based on manufacturing variables. The method creates a sequence of runs of insulating glass units to be produced for assembly to window or door sash and frames at a plurality of glazing lines. A status of the runs, a status of one or more insulating glass component processing machines, and/or a queue of insulating glass units to be assembled to window or door sash and frames at the glazing lines is monitored at a production control workstation. The sequence of runs is altered at the production control workstation based on one of the status of the runs, the status of the one or more glass processing machines, and the queue of insulating glass units at the glazing line.

37 Claims, 13 Drawing Sheets

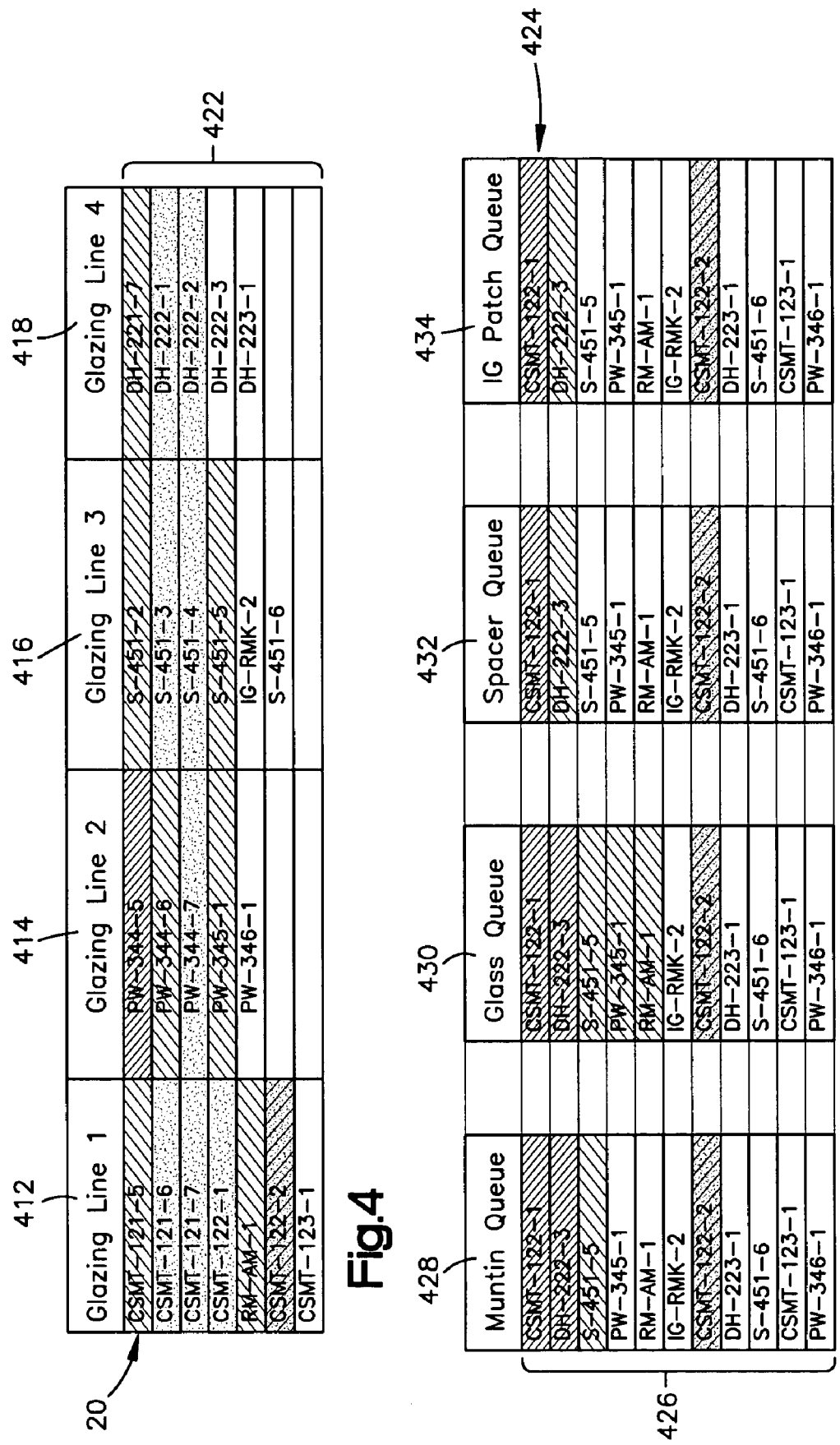

GLASS PRODUCTION SEQUENCING

CROSS REFERENCE TO RELATED APPLICATION

The present application is a continuation-in-part of U.S. application Ser. No. 10/646,191, entitled "Glass Optimization" filed Aug. 22, 2003 now abandoned.

FIELD OF THE INVENTION

The present invention concerns a method and apparatus for controlling production run sequences of insulating glass units.

BACKGROUND ART

Window manufacturers typically receive orders that include a variety of different sizes and types of windows and/or patio doors. The different sizes and types of windows and/or patio doors require different sizes and types of insulating glass units (IGs) that are assembled into a frame or sash to form a completed window or patio door at one or more glazing lines. The window manufacturers separate and group the orders for the IGs into regular or planned production runs. The regular or planned production runs are scheduled to be manufactured in a certain sequence on a certain future date, usually within one to three business days ahead.

Variables in the manufacturing process rarely allow the regular production runs to be manufactured in the exact planned sequence. For example, rush orders for important customers and remake orders that occur when IGs break are often prioritized, changing the sequence of the production runs. The operational status of machines used to make the components of the IGs may also cause the sequence of the regular or planned production runs to be altered. Further, demand fluctuations, such as a shortage at one of the glazing lines may cause the sequence of the regular or planned production runs to be altered. As a result, a supervisor of an IG production line must constantly monitor each of the manufacturing variables and modify the sequence of the production runs accordingly.

Current methods employed by IG supervisors for monitoring IG manufacturing variables and modifying production run sequences are slow, inaccurate and confusing. The existing methods typically rely on informal communications, such as word of mouth, handwritten documents and manual data entry. Use of these non-automated forms of communication often confuse operators, tie up machines and delay standard manufacturing procedures. Use of these informal communication methods cause production efficiencies to drop even further while new employees are being trained or new machines are being commissioned.

The glass lites that are needed to construct the IGs are separated and grouped into scheduled production batches or runs. For each production batch, the glass lites are further grouped and arranged to be cut from large stock glass sheets to achieve the highest yield. The process of grouping and arranging glass lites to be cut from stock glass sheets to achieve the highest yield is called glass optimization.

Glass optimization is usually performed by a computer executing a computer program. The output from the glass optimization process is a control program that is sent to a computer-controlled cutting table. The glass optimization software outputs a computer program that optimizes one or more production batches containing patterns of lites arranged on stock glass sheets. The cutting table automatically scores the glass according to each pattern. Each production batch normally contains one or more glass layout patterns that provide a lower yield than desirable.

These Low Yield Patterns or Low Yield Sheets significantly reduce the yield of entire production batches resulting in higher manufacturing costs due to wasted glass. Waste is particularly expensive when manufacturing windows from increasingly popular specialty glasses such as Low-E or self-cleaning materials.

Today, there are several existing methodologies used to increase glass yields. Unfortunately, each method presents one or more problems to manufacturing operations. The methods and their resulting problems are described below.

a) Standard dimensioned lites called filler lites can be introduced to scheduled production batches to fill-in unused space on the stock glass sheets. The glass optimization software determines where filler lites can be inserted when creating the initial programmed patterns. Because fillers are inserted prior to the actual manufacturing process, the number and type of filler lites rarely meet actual production demand. Too few filler lites starve production lines while too many fillers create storage and quality problems.

b) Adding different sizes of large sheets can be stocked to increase yield. This allows the glass optimization software to pick the size of stock sheets that produce the best yield. Although this method enhances yield, it also increases inventory space and costs while decreasing throughput (more glass sizes to shuttle in and out).

c) Certain cutting tables allow the sizes and types of lites from Low Yield Sheets to be manually entered at the cutting table controller with the sizes and types of other of selected lites, then re-optimized to increase yields. Although these features provide flexibility and increase yield, they also cause the cutting table to remain idle during the manual entry process. This greatly reduces production throughput and efficiency.

SUMMARY OF THE INVENTION

The present invention is directed to a method of controlling production run sequences of insulating glass units based on manufacturing variables. One method that embodies the present invention creates a planned sequence of runs of insulating glass units to be produced for assembly to window or door sash and frames at a plurality of glazing lines. A status of the runs, a status of one or more insulating glass component processing machines, and/or a queue of insulating glass units to be assembled to window or door sash and frames at the glazing lines is monitored at a production control workstation. The sequence of runs is altered at the production control workstation based on the status of the runs, the status of the one or more glass processing machines, and/or the queue of insulating glass units at the glazing line.

In one embodiment, the method alters the planned sequence of runs based on a number of runs of insulating glass units in queue at a glazing line. In this embodiment, a number of runs of assembled insulating glass units in queue to be assembled to window or door sash and frames at a given glazing line are monitored. A low queue condition is identified at the given glazing line. The low queue condition of the given glazing line is electronically communicated to a production control workstation. The sequence of produc tion runs is altered at the production control workstation to resolve the low queue condition at the given glazing line.

In one embodiment, the low queue condition is automatically identified when the number of runs in queue at the given glazing line reaches a predetermined queue lower limit. For example, the number of runs of assembled insulating glass units in queue to be assembled to window or door sash and frames at the given glazing line may be automatically monitored by identifying runs of assembled insulating glass units that are delivered to the given glazing line and identifying runs of assembled insulating glass units that are processed at the given glazing line. The runs of assembled insulating glass units that are delivered to the given glazing line and runs of assembled insulating glass units that are processed at the given glazing line may be identified by scanning an identification label. In another embodiment, the low queue is manually identified and entered into a programmable device by a glazing line worker.

In one embodiment, a next available run of insulating glass units that can be produced for the given glazing line is highlighted on the production control workstation. This highlighting prompts the IG supervisor at the production control workstation to prioritize the highlighted next available run for the given glazing line.

In one embodiment, a number of low queue conditions at the given glazing line are tracked. In this embodiment, a predetermined queue lower limit is adjusted based on the tracked number of low queue conditions.

In one embodiment, a run of insulating glass units required by the given glazing line is prioritized. The prioritized run is electronically communicated from the given glazing line to the production control workstation. The sequence of runs is altered at the production control workstation to produce the prioritized run of insulating glass units earlier in time. In one embodiment, the prioritized run is a rush run or a remake run. In one embodiment, a sequence of production runs in progress is prevented from being altered.

One embodiment of the invention features a method of controlling production run sequences of insulating glass units that addresses low queue conditions at an IG fabrication station. In this embodiment, a sequence of runs of insulating glass components to be produced for assembly into insulating glass units at an assembly station is created. A number of runs of completed insulating glass components in queue to be assembled into insulating glass units at the assembly station is monitored to identify a low queue condition of a given type of insulating glass component. The low queue condition of the given type of insulating glass component is electronically communicated to a production control workstation. The sequence of runs is altered to resolve the low queue condition of the given type of insulating glass component.

One system for controlling production run sequences of insulating glass units includes window component processing stations, a plurality of glazing lines, and one or more controllers or ancillary computers. The window component processing stations process components of the IGs to produce assembled insulating glass units. The IGs are assembled into window or door sash and frames at the plurality of glazing lines. The controller or ancillary computer includes a programmable device in communication with the window component processing stations and the plurality of glazing lines. In this system, the programmable device monitors a status of the runs, a status of one or more insulating glass component processing machines, and/or a queue of insulating glass units to be assembled to window or door sash and frames at the glazing lines is monitored at a production control workstation. The sequence of runs is altered at the production control workstation based on the status of the runs, the status of the one or more glass processing machines, and/or the queue of insulating glass units at the glazing line.

In another embodiment of the system, the programmable device creates a sequence of runs of insulating glass units to be produced for assembly to window or door sash and frames at the plurality of glazing lines, monitors a number of runs of assembled insulating glass units in queue to be assembled to window or door sash and frames at a given glazing line of the plurality of glazing lines, identifies a low queue conditions, and alters the sequence of runs to resolve the low queue condition at the given glazing line. In one embodiment, instructions of the programmable device are stored on a computer readable medium.

These and other objects and advantages of the system constructed in accordance with an exemplary embodiment of the invention is more completely described in conjunction with the accompanying drawings.

BRIEF DESCRIPTION OF THE DRAWINGS

FIG. 4 is a schematic representation of a user interface by means of which an operator controls production run sequences;

FIG. 5 is a schematic representation of a user interface by means of which an operator controls production run sequences;

BEST MODE FOR PRACTICING THE INVENTION

Figure 2:
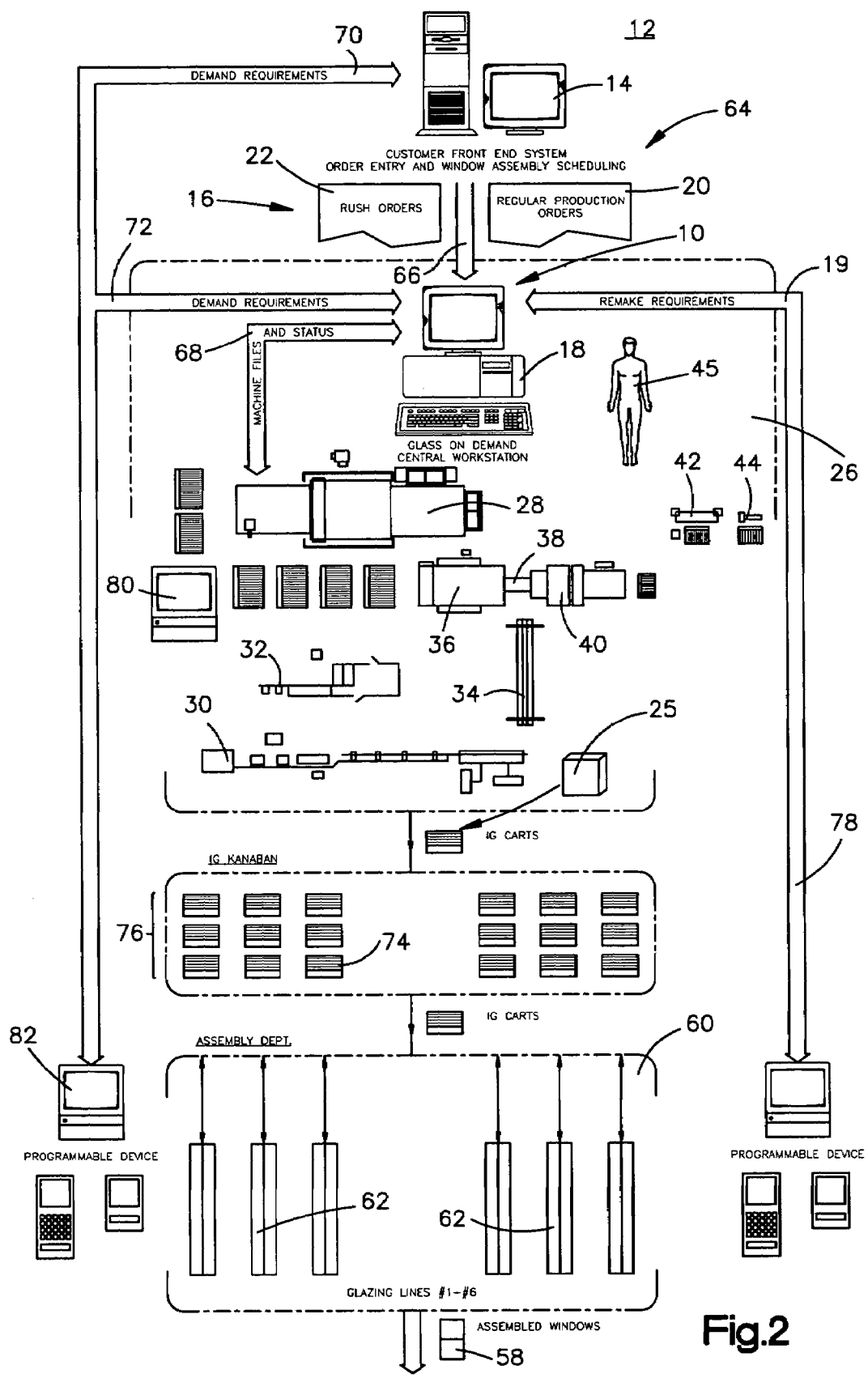
FIG. 2 is a schematic representation of a window and/or door manufacturing facility equipped with a system for controlling production run sequences of insulating glass units.

The disclosed invention provides an integrated software and apparatus solution used in the manufacture of windows and/or doors for dynamically monitoring manufacturing variables and controlling production sequences using central production control workstation 10 (FIG. 2).

Figure 1:
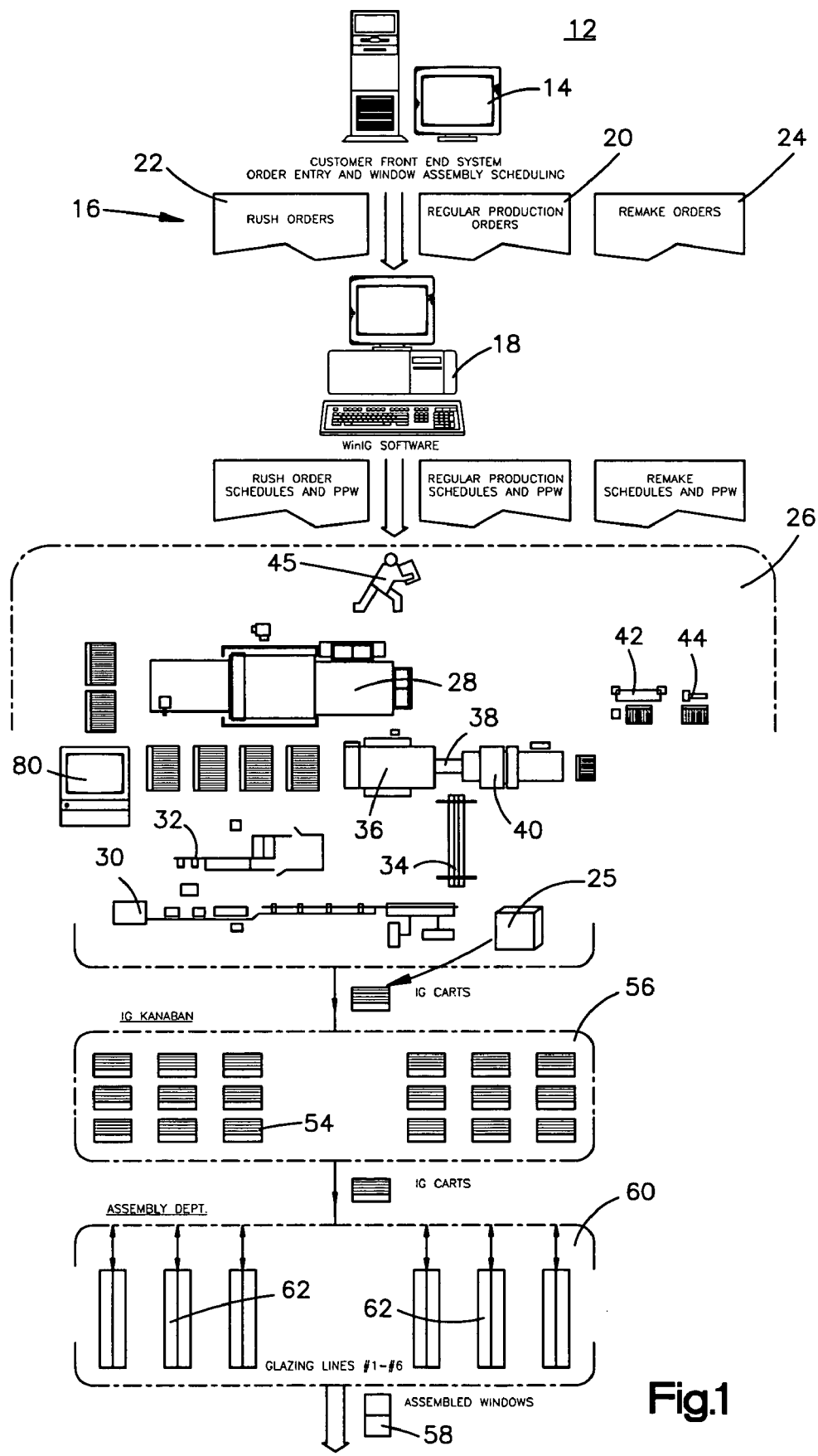
FIG. 1 is a schematic representation of a window and/or door manufacturing facility.

FIG. 1 schematically illustrates a window and/or door manufacturing facility 12. The facility 12 includes a front end system or terminal 14 where orders for windows and/or doors are entered and window assembly is scheduled. The front end system 14 provides orders 16 to an insulating glass unit (IG) production control terminal 18. The orders 16 may include regular production orders 20, rush orders 22, and remake orders 24. The rush orders 22 are orders that are prioritized, usually due to a customer demand. The remake orders 24 are entered when a IG 25, a component of an IG, or a finished window or door 58 is damaged. In the exemplary embodiment, remake orders are provided directly to the central control workstation 18 by an electronic communication 19 from a glazing line or a window component processing station (FIG. 2). The regular production orders 20 are orders that have not been tagged as a rush order or a re-make order.

The production control terminal 18 receives the orders 16 as input and creates a sequence of runs of insulating glass units to be produced at an insulating glass unit (IG) department 26. In the illustrated embodiment, the IG department includes several insulating glass component processing machines or stations that construct IG components and assemble the IG components to create IGs. In the illustrated embodiment, the IG component processing stations include a glass cutting station 28, a spacer frame production station 30, a muntin bar production station 32, a muntin bar assembly station 34, a glass washing station 36, an IG assembly station 38, an oven 40, a gas fill station 42, and a patching station 44. Glass lites 46, spacer frames 48, and muntin bars 50 are constructed at the glass cutting station 28, the spacer frame production station 30, and the muntin bar production station respectively. The glass lites, spacer frames, and muntin bar grids 50 are assembled to form IGs at the IG assembly station 38. The IGs are fed through the oven/press 40, which presses the IG to a predetermined thickness and heats the adhesive/sealant that secures the lites to the spacer frame. The IGs are then filled with an inert gas at the gas fill station 42 and patched at the patching station 44. An IG department supervisor 45 is responsible for managing each of the IG component processing stations to ensure that demands for IGs by a glazing department 60 are met.

To simplify the disclosure of this inventive method and apparatus, the term glazing is to be interpreted as installing a glass lite or IG in any window or door component and the term sash is to be interpreted as any window or door component that surrounds a glass lite.

Once patched, the finished IGs are placed on carts 54 in a staging area 56. The IGs are taken from the carts 54 and are assembled with window sash and frames or doors in a glazing department 60 to construct completed windows and/or doors 58. Assembly of an IG to a window or door sash and/or a frame is broadly referred to herein as glazing. The glazing department 60 includes several discrete glazing lines 62.

FIG. 2 illustrates a window and/or door manufacturing facility 12 equipped with a system 64 for controlling production run sequences of insulating glass units. In the embodiment illustrated by FIG. 2, the production control terminal 18 receives orders electronically as indicated by arrow 66 from the front end system 14. The control terminal 18 electronically sends and receives information to and from the glass component processing machines as indicated by arrow 68. The front end system 14 and the control terminal 18 receive demand information electronically from the glazing lines as indicated by arrows 70, 72 respectively. This information includes a number of runs 74 in a queue 76 for each glazing line. The control terminal 18 also receives remake requirement information from the glazing lines as indicated by arrow 78. Additional remake information may be provided from one or more of the stations in the IG department.

In the exemplary embodiment, the production control terminal 18 is a controller or ancillary computer including a programmable device in communication with a programmable device 80 located at each window component processing station and a programmable device 82 located at the plurality of glazing lines. In the exemplary embodiment, programmable devices 80 are electrically coupled to controllers of window component processing stations that include compatible machine controllers. This allows the sequence of these window processing stations to be altered automatically. Compatible machines automatically run the next production run in the sequence, if configured for Auto Sequencing. Such window component processing stations include the glass cutting station 28, the spacer frame production station 30, the muntin bar production station 32, and the oven 40, in the exemplary embodiment. Non-compatible machines utilize the satellite programmable devices 80 to alert the operator of the new production run sequence. Such stations may include a muntin bar assembly station 34, the glass washing station 36, an IG assembly station 38, a gas fill station 42, and a patching station 44.

Figure 3:
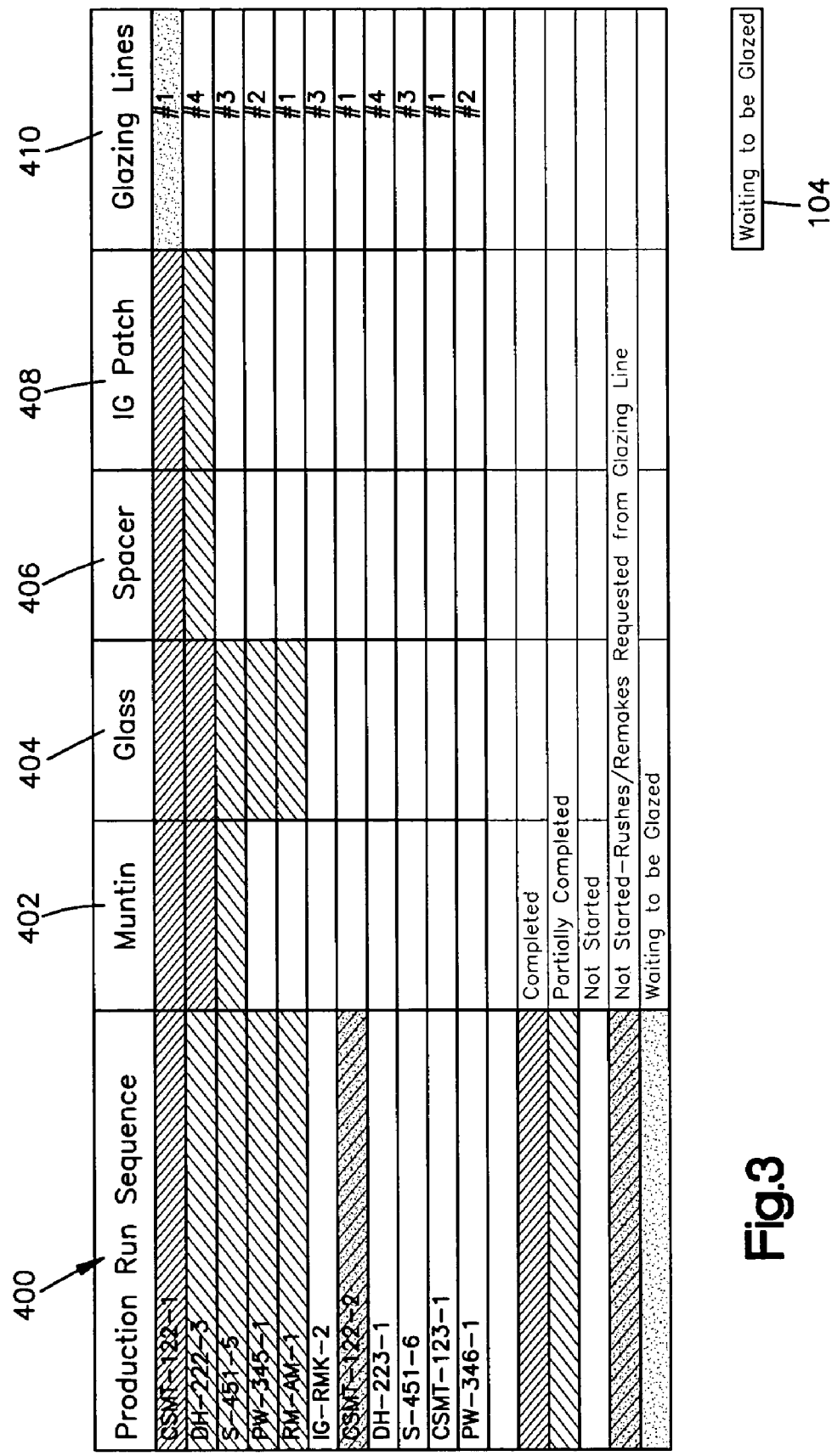
FIG. 3 is a schematic representation of a user interface by means of which an operator controls production run sequences.

Referring to FIGS. 3–5, the status of the runs of IGs, the status of the insulating glass component processing machines, and the queue of insulating glass units to be assembled at each glazing line can be viewed at the production control terminal 18 or workstation. The screen illustrated by FIG. 3 provides the IG supervisor with the status of complete IG production runs, the status of runs of IG components, and the status of completed IG runs in queue at the glazing lines. Column 400 provides the IG supervisor with the overall status of IG production runs. Column 402 provides the IG supervisor with the status of runs of muntin bars that correspond to each overall IG production run. Column 404 provides the IG supervisor with the status of runs of glass lites that correspond to each overall IG production run. Column 406 provides the IG supervisor with the status of runs of spacer frames that correspond to each overall IG production run. Column 408 provides the IG supervisor with the status of the IG runs of at the gas fill and patching station. Column 410 provides the IG supervisor with the glazing line number or description and the status of each completed IG production run at the identified glazing line.

The screen of FIG. 4 provides the IG supervisor with the status of the completed IG runs in the glazing queue of each glazing line. On the screen illustrated by FIG. 4, columns 412, 414, 416, 418 provide the status of each run 420 of assembled IGs in the queues 422 of glazing lines 1, 2, 3, and 4 respectively. The stiphing and cross-hatching of FIG. 4 corresponds to the legend shown in FIG. 3.

The screen illustrated by FIG. 5 provides the IG supervisor with the status of each production run 424 in the production run queue for each window component processing station. Column 428 provides the status of the muntin runs. Column 430 provides the status of the glass cutting runs. Column 432 provides the status of the spacer frame runs. Column 434 provides the status of the IGs at the gas fill and patch station.

The IG supervisor alters the sequence of runs based on one of the status of the runs, the status of one or more of the glass processing machines, and the queue of insulating glass units at the glazing line at the production control terminal. In the exemplary embodiment, the following manufacturing variables can all be monitored at the production control terminal 18:

a) The status of sequenced regular, rush or remake production runs.

b) The status of sequenced muntin production runs and machine status at the muntin bar production Station 32.

c) The status of sequenced glass production runs and machine status.
d) The status of sequenced spacer production runs and machine status.
e) The status of sequenced IG patch production runs.
f) The status of production runs in each glazing line queue.
g) Electronic requests to prioritize specific regular, rush or remake production runs.

Figure 6:
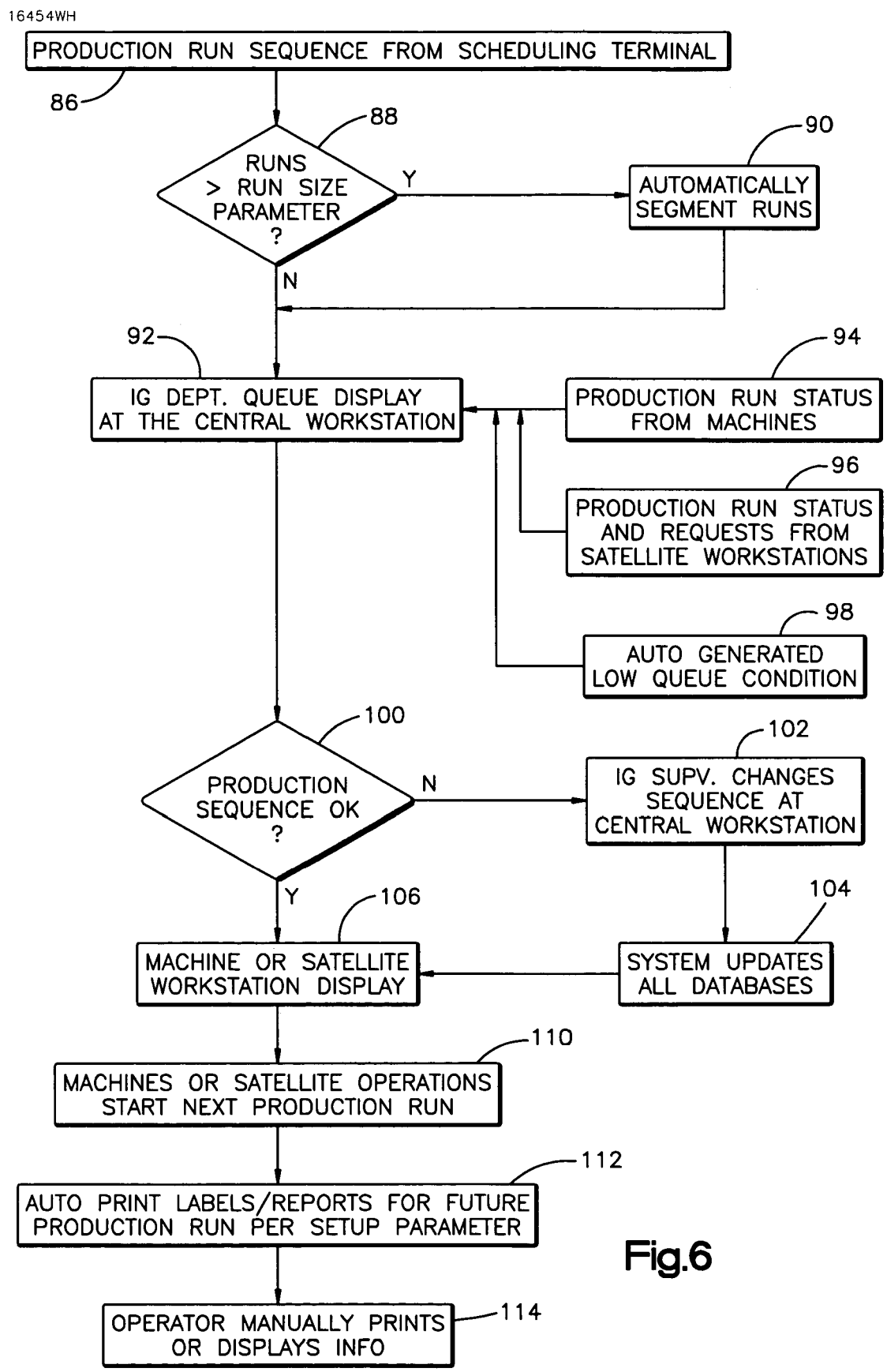
FIG. 6 is a flow chart that illustrates one method of controlling production run sequences.

Referring to the flow chart of FIG. 6, in the exemplary embodiment production run sequences are downloaded 86 from the terminal 14 to the control terminal 18. Software running on the control terminal 18 determines 88 whether the runs received from the customer terminal 14 are larger than a user defined Run Size Parameter. If the number of IG units per production run surpass the number of IG units specified in the Production Run Size Parameter, the method automatically divides or segments 90 the runs into segments based on the size parameter setting. In the exemplary embodiment, the Production Run Size Parameter is entered by a user via a setup menu. Some customers create one or more very large daily production runs. For those customers, the system automatically segments large runs from the terminal 14 into a number of smaller runs, identifying each as some subset of the whole. Small production runs, typically matching the IG cart size, provide the flexibility required to properly level-load the glazing lines.

The IG supervisor may view 92 the IG Department Queue at the Central Workstation 18 (see FIG. 3). This view provides the supervisor with an accurate snapshot of the status of all scheduled IG production runs via color codes (These codes are designated by cross-hatching and stiphing different patterns in the Figures). The supervisor can view the production run status 94 of each of the machines, the overall production run status and requests to prioritize a particular run 96 from satellite devices 80, 82, and low queue conditions 98 from the glazing lines. A low queue condition at a glazing line may be automatically detected or entered through a satellite device by a glazing line worker. In the exemplary embodiment, the supervisor uses the information on the display to determine 100 whether the current production sequence maintains an efficient, uninterrupted production flow through the IG Department. If the current production sequence would not result in an efficient, uninterrupted production flow through the IG Department, the IG supervisor changes 102 the production control sequence at the control workstation 18. In an alternate embodiment, the determination 100 of whether action needs to be taken and the run sequence changed 102 is performed by the software in the control terminal 18. Each status or sequence changed at the central control terminal 18 is updated 104 automatically and provided 106 to all of IG component processing stations and the glazing lines by compatible machine software and/or the satellite programmable devices 80, 82.

In the exemplary embodiment, a change of the production run sequence at the central workstation, immediately changes the corresponding sequences in a database maintained at the workstation 18 and display of compatible machine controllers and satellite programmable devices. Compatible machines automatically run 110 the next production run in the sequence, if configured for auto sequencing. Non-compatible machines utilize satellite programmable devices to alert the operator of the new production run sequence.

In the exemplary embodiment, required labels and reports are automatically printed 112 for each production run using a compatible printer. A parameter in the setup menu determines how far in advance to print labels and reports for each production run. The IG supervisor may manually print selected reports via a user-friendly menu. The labels and reports will accompany the IG through the manufacturing process. In the exemplary embodiment, an operator may use the graphical display to print and/or display 114 labels, reports, and/or low queue condition statistics.

A number of factors dictate whether the IG supervisor (or the computer program loaded on the control terminal 18) needs to change the production run sequence. Examples include ease of production, delivery priority, component availability and glazing line requirements. Based on these factors, the IG supervisor uses a graphical "drag and drop" function on the screen of the control terminal 18 to change the production run sequence. In the exemplary embodiment, the system will not allow the IG supervisor to change the sequence of any completed or partially completed production runs. A partially completed production run has either been started at the machine or is reserved using a Production Run Look-Ahead Parameter. This parameter reserves a specific number of the next available production runs for glass optimization purposes or to give the IG supervisor sufficient time to print and deliver labels and reports to the production floor. The Production Run Look-Ahead Parameter is entered via a setup menu.

In the exemplary embodiment, the system may allow the IG supervisor to display the glazing line queue (see FIG. 4). The supervisor uses this display to monitor the level-loading of each glazing line and changes the run sequence as needed to prevent low queue conditions at a given glazing line. In one embodiment, the system includes a glazing line monitoring system. In this embodiment, the system automatically monitors each glazing line queue 422 for a "low queue condition." This condition is met when the production runs 104 waiting to be glazed fall below a parameter set for each glazing line 62 in the setup menu. In the exemplary embodiment, the low queue condition is automatically detected by identifying runs of assembled insulating glass units that are delivered to each glazing line and identifying runs of assembled insulating glass units that are assembled to windows, or otherwise processed at each glazing line. In the exemplary embodiment, this identifying of runs of IGs that enter and exit the glazing lines is performed by scanning an identification label.

If the "low queue condition" is met, the system automatically highlights the next available production run for that glazing line in red at the central workstation 18. This highlighting alerts the IG supervisor that he should change the sequence to prevent shutting down the glazing line.

In one embodiment, glazing line personnel may also use satellite programmable devices 82 located at each glazing line to force a "low queue condition". This feature allows the glazing line personnel to request the next available production run for that glazing line from the IG Department at the terminal 18. Glazing line personnel may also use satellite programmable devices to prioritize specific regular, rush or remake production runs. The request alerts the IG supervisor by highlighting the corresponding production run on the display of the central workstation 18.

In the exemplary embodiment, the invention allows the IG supervisor to react to manufacturing variables by modifying the sequence of the production runs using a graphical drag and drop function. The software uses the input from the drag and drop function to create a new or altered production run sequence. Once the software has completed creating the new production run sequence, the system automatically performs the following tasks:

a) Changes the sequence of the production runs in the central workstation 18 database and updates the display (see FIGS. 3 and 4).
  b) Changes the sequence of the production runs in each manufacturing machine with a compatible database and updates the display (see FIG. 5).
  c) Changes the sequence of the production runs in the database of each satellite programmable device adjacent to non-compatible machines or manual production areas and updates the display (see FIG. 5).
  d) Changes the sequence of the production runs in the database of each satellite programmable device at the glazing lines (see FIG. 4).
  e) Prints the appropriate production paperwork and labels to accompany the corresponding IG.

The system includes three software tools that help manage each glazing line queue. The first tool provides a parameter in the setup menu to dictate the minimum number of production runs staged for each glazing line. The system uses this parameter to automatically alert the IG supervisor of a "low queue condition" by highlighting the next available production run for that glazing line in red when the number of production runs in queue falls below the set minimum number. The IG supervisor will then make the decision to change the priority of that production run.

The second tool provides statistics describing the number of "low queue conditions" for each glazing line over time. This provides the IG supervisor with information to increase or reduce the size of the queue limit for each glazing line These tools help the IG supervisor optimize the size of the glazing line queues to achieve the highest throughput.

The third tool allows glazing line personnel to use a satellite programmable device 82 to force a "low queue condition" or to prioritize a specific regular, rush or remake production run for a particular glazing line. The request alerts the IG supervisor by highlighting the corresponding production run on the display of the central workstation.

The disclosed system provides the IG supervisor with real-time, accurate and simple tools to monitor manufacturing variables and control production run sequences. The supervisor will easily accomplish existing tasks in a fraction of the time, using accurate real-time data. Production run sequences will be set in plenty of time to continue standard manufacturing procedures without any loss of production efficiency.

One component of the disclosed system is a glass optimization module for increasing the yield of glass cutting runs during window or door manufacture, or other manufacture requiring glass lites. An exemplary glass optimization module or program automatically recognizes and optimizes Low Yield Sheets by adding glass lites from other production batches as well as lites entered or selected at the cutting station 28. The exemplary glass optimization module also automatically creates, tracks, selects and re-cuts remnant sheets of glass if the process is unable to add sufficient lites to eliminate Low Yield Sheets from a production batch.

Figure 7:
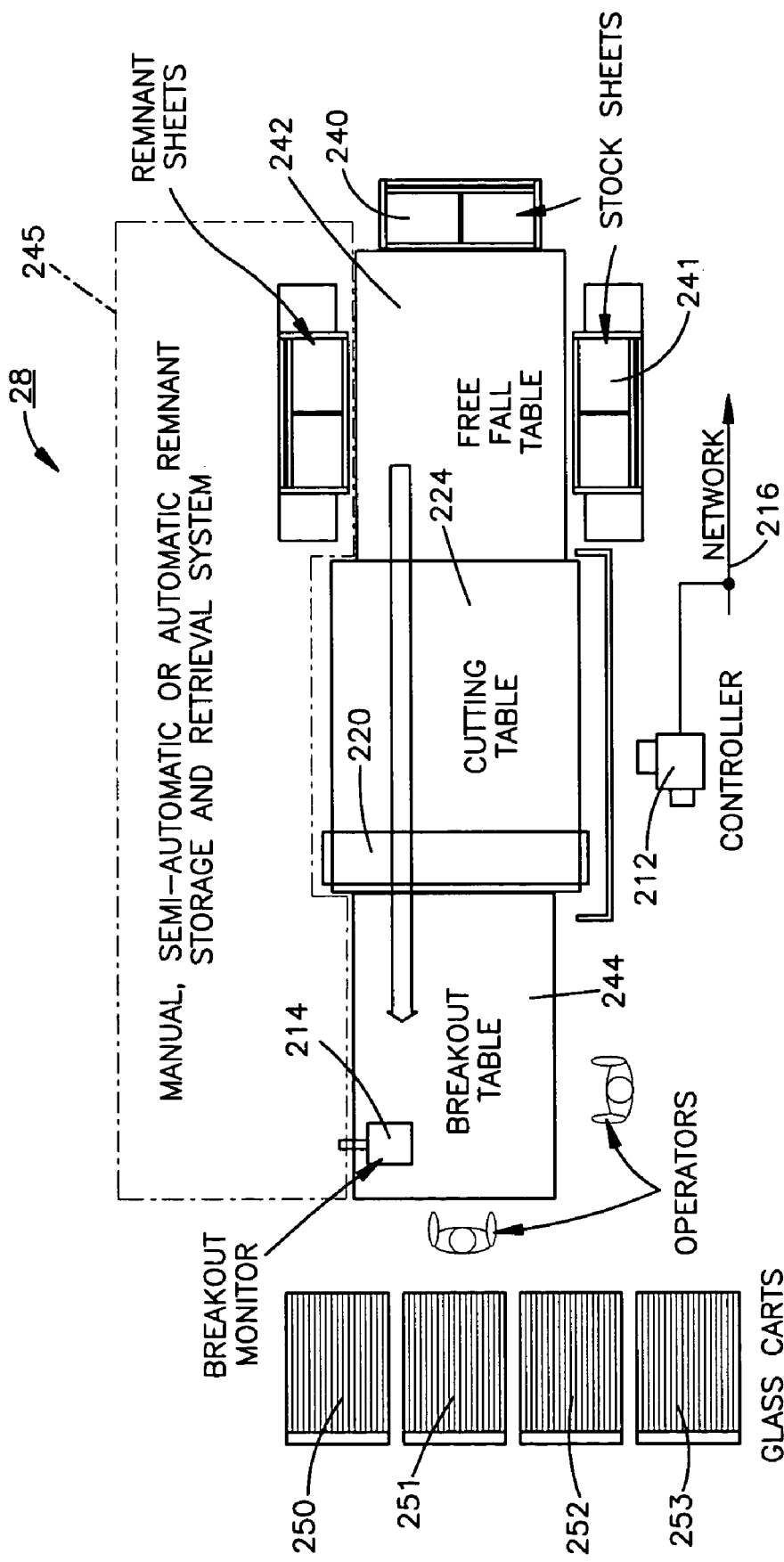
FIG. 7 is a schematic representation of a cutting station located within a window or door manufacturing facility.

The FIG. 7 cutting station 28 includes a controller 212 that provides the cutting station operator an option of easily selecting filler lite sizes that can be automatically inserted into each production batch. The controller is coupled to a display or breakout monitor 214 that graphically alerts the cutting table operator(s) which cart and slot to place each lite as it is cut. The controller 212 and breakout monitor 214 also graphically alert the cutting table operator(s) where to place or remove remnant sheets for subsequent processing. The controller and breakout monitor also graphically alert the cutting table operator(s) which temporary cart slot to place or remove lites for subsequent processing.

In addition, the system tracks and reports yield, throughput and filler lite information in real-time to the cutting table display or monitor 214 as well as other computers by means of a network 216 which allows the controller 212 to communicate with other computers in the manufacturing facility, including the central control terminal 18. These other computers include computer-controlled manufacturing devices at other workstations and computer software for controlling the entire manufacturing process.

FIG. 7 depicts representative apparatus for optimizing the fabrication of products that include lites cut from said glass sheets. The cutting station 28 including a moveable cutting head 220 supported for movement with respect to a glass sheet 222 (FIG. 9) positioned on a cutting table 224 with respect to the cutting head 220 from which glass lites are cut. The same controller 212 that updates the display or monitor 214 is also responsible for controlling the movement with respect to the cutting table of the cutting head 220.

Figure 9:
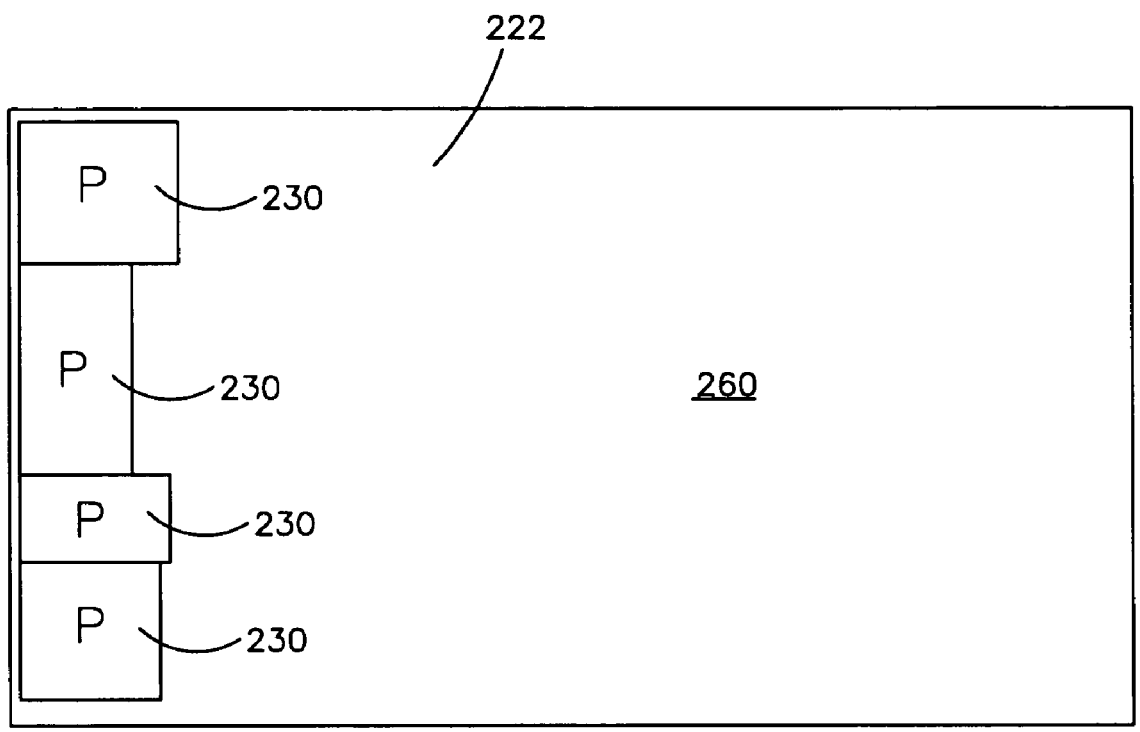
FIGS. 9–15 are schematic depictions of glass sheets illustrating layouts of lites to be cut from the sheets at the cutting station.
Figure 10:
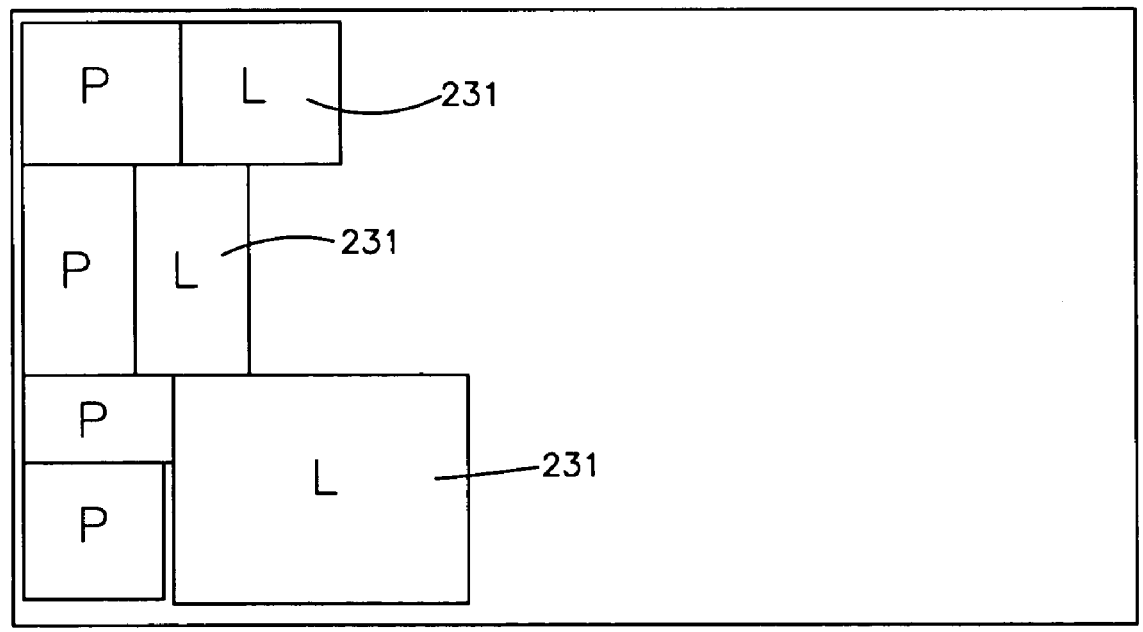

FIG. 9 shows a representative sheet 222 having a number of lites 230–233 scheduled to be cut from specified locations on the sheet 222. Typical dimensions (prior to cutting) for a sheet such as the sheet 222 shown in FIG. 9 are 72 inches by 84 inches. Other standard sizes are 96" by 130" and 48" by 60".

The sheet 222 is removed by an operator from one of two racks 240, 241 (FIG. 7) positioned in relation to the cutting table 224. The sheet is placed on its edge at the side or at the end of a free fall table 242. The table 242 has a relatively smooth and soft top surface onto which the glass sheet falls. From its position on the table the sheet is automatically transferred to the cutting table 224. While on the cutting table 224 the sheet 222 is cut by the cutting head and then moved to a break out table 244. At the break out table 244 an operator breaks out the lites from the glass sheet 222.

As seen in FIG. 7, a number of carts 250–253 are positioned with respect to the cutting station 28 for storing lites as they are cut from a glass sheet 222 by the cutting head 220. The controller 212 or another ancillary computer includes software running on a processor, which performs a number of tasks used by the system for making the glass cutting process more efficient. The controller lists a number of batches wherein each batch requires a specified number and type of glass lites for use in fabricating products in an associated job. The controller 212 (or ancillary computer) and breakout monitor 214 displays a pattern of lites to be cut from a first set of glass sheets to fulfill the lite requirements for one batch and during cutting prompts the operator to place the lites for that job into a single one of the four carts 250–253.

The controller 212 or ancillary computer is capable of recognizing and adjusting to under utilized glass sheets. In accordance with one exemplary embodiment of the invention, under utilized glass sheet is any sheet where less than 70% of the sheet has lites allocated for a given job. The sheet 222 depicted in FIG. 9 is an underutilized glass sheet having free space 260 with no lites designated to be cut for the batch that the sheet 222 is associated with. The four lites 230 that have been designated for a particular batch have been labeled with the designation "P" to indicate that they are associated with a particular production batch. These four lites 230–233 take up much less than the 70% cutoff.

As explained more fully below, the controller 212 or ancillary computer responds to recognition of such an underutilized sheet by laying out a pattern of lites to be cut to fulfill other lite requirements, possibly the other requirements one or more additional batches in a queue of such batches. The controller utilizes at least some of the free space 260 on the underutilized glass sheets of a first batch by designating usage of the free space 260 for other batches. The controller 212 or ancillary computer then completes the designated lites for those other or subsequent batches by laying out other glass sheets from which to cut other lites in that subsequent batch(es). This process, of course, takes into account the lites that have already been designated from the underutilized sheet or sheets of the previous batch or batches.

Operation of the Cutting Station 28

The software running on the controller or ancillary computer of the cutting station begins heuristically optimizing a next production batch in a queue of such batches by identifying a Low Yield Sheet if it exists. The controller or ancillary computer automatically calculates how to fill the sheet according to a list of priorities exemplified by the flowchart 310 in FIGS. 16A and 16B. To help illustrate the process of FIGS. 16A and 16B, in FIGS. 9–15 the glass lites are labeled with designators depending on where in the list of priorities these lites are identified for inclusion onto a Low Yield Sheet.

The highest priority is a regular production batch lite P. A next highest priority is a local remake or MDI lite L. Three such lites 31 are depicted in FIG. 4. An MDI lite is typically made in response to a request due to breakage or a prior knowledge of a need by the cutting station operator. MDI lite information is entered by the operator at controller 212 using a keypad. A local remake is typically required because a lite is broken at the cutting table. Local remake information is entered by the operator using pushbuttons to highlight the lite that needs to be replaced on the breakout monitor or on the controller display.

Figure 11:
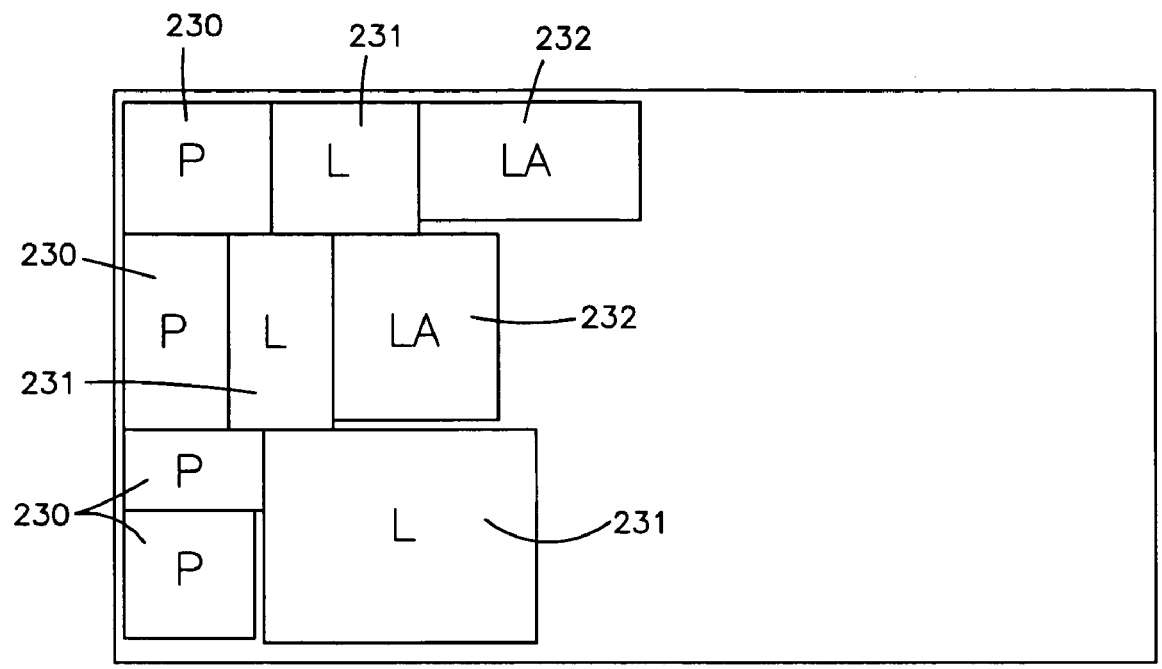
Figure 12:
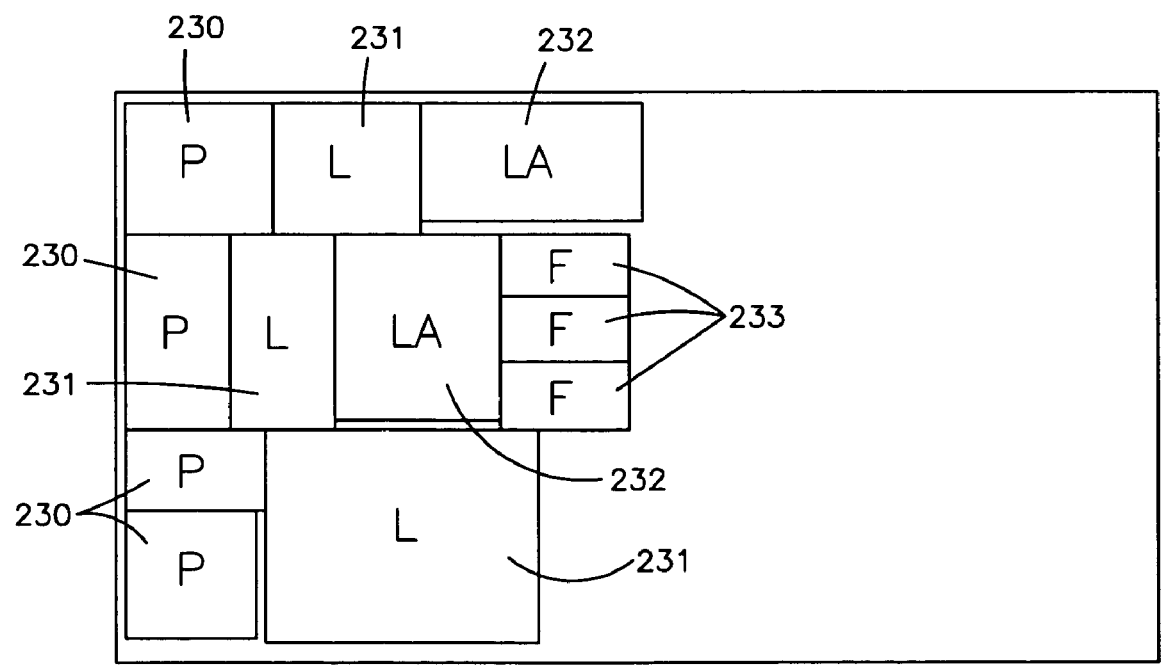
Figure 13:
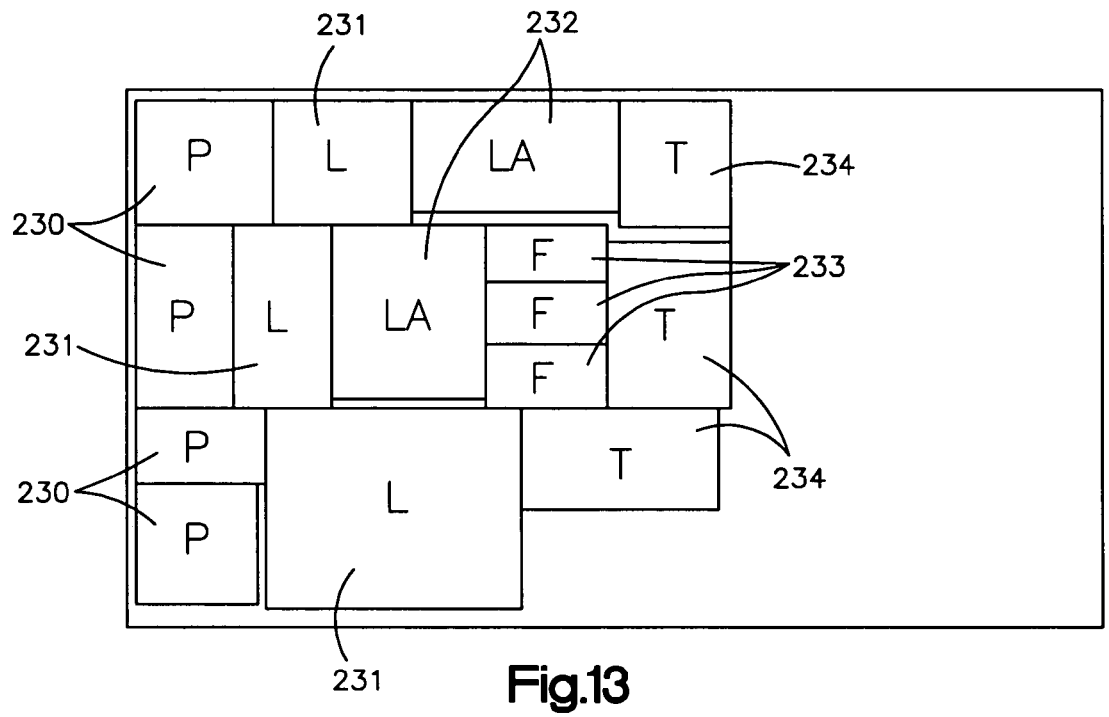
Figure 14:
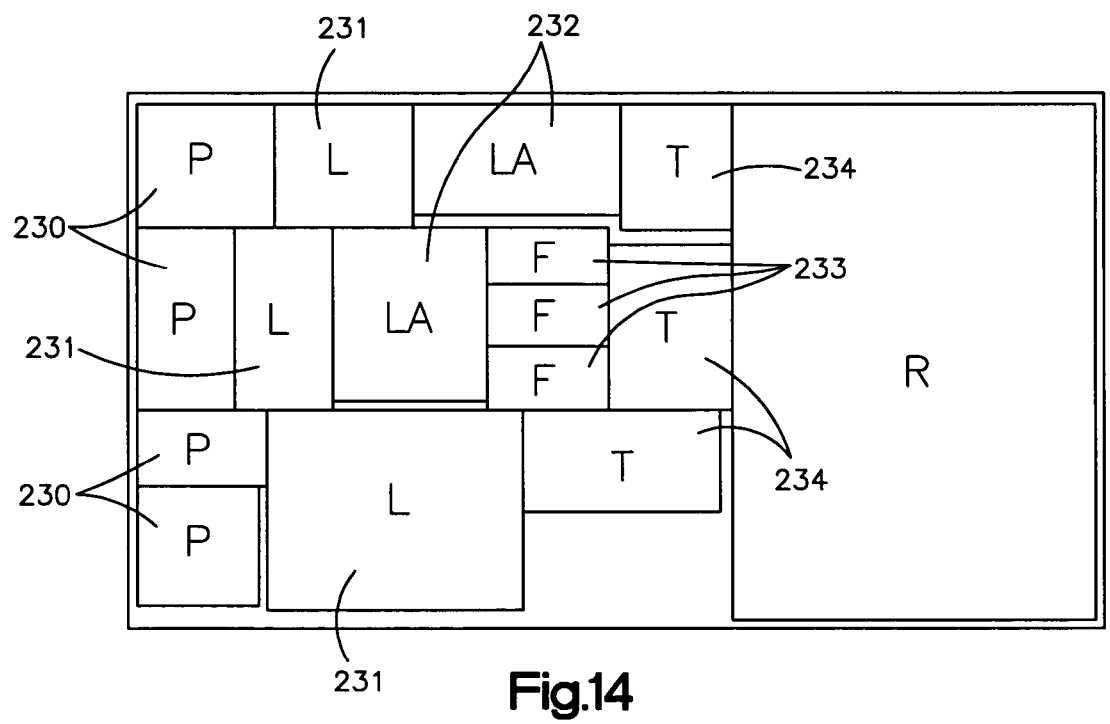
Figure 15:
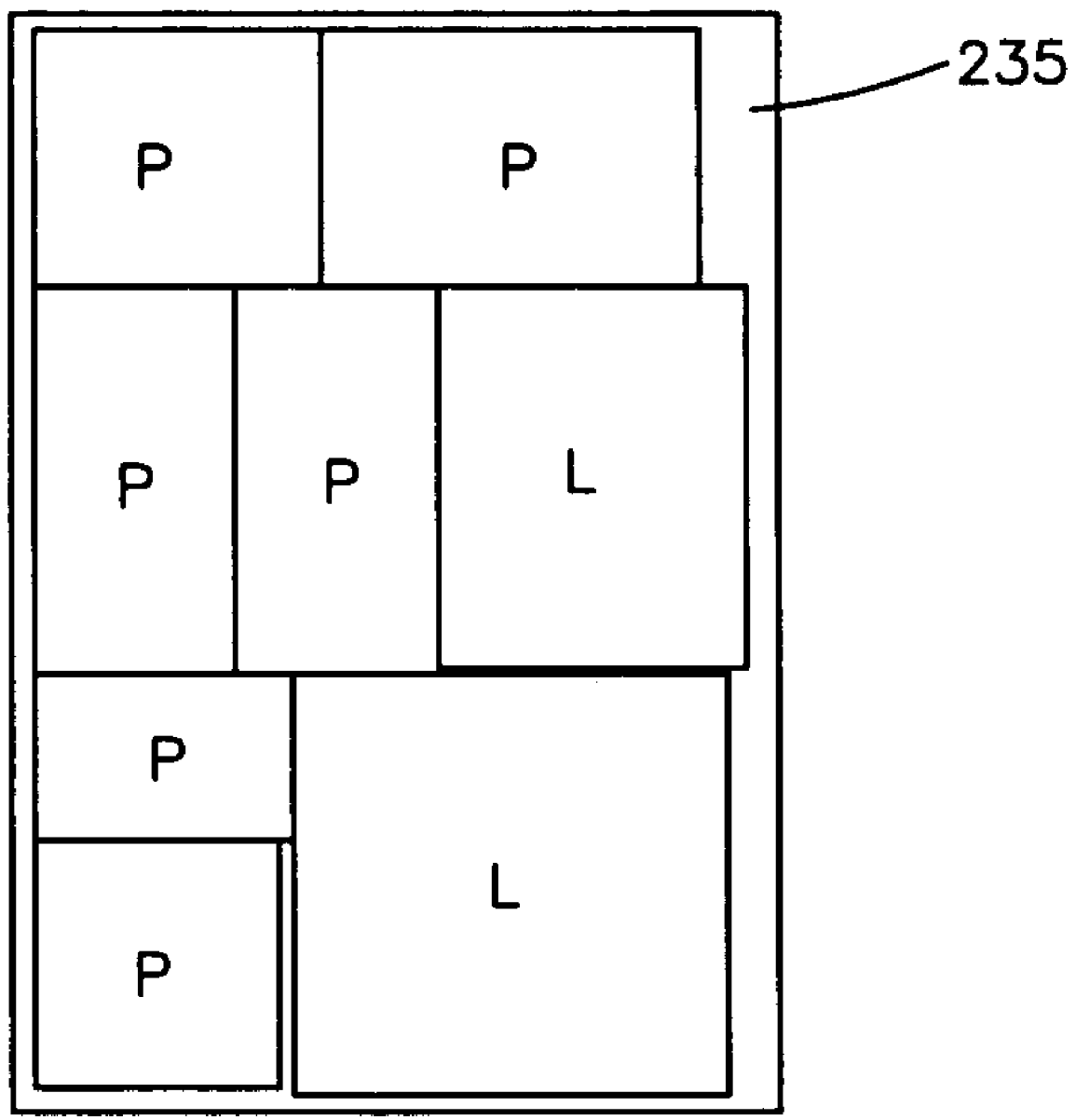

A next highest priority lite inserted into the Low Yield Sheet is a production run look ahead lite LA. Two such lites 232 are depicted in FIG. 11. A typical manufacturing sequence of batches will have need for lites from the same type of glass in multiple batches. The system recognizes this need by inserting lites for subsequent batches on a Low Yield Sheet. These are called look ahead lites LA because the system "looks ahead" to subsequent jobs for lites to add to a Low Yield Sheet. As the operator breaks out the lites from a sheet the viewing monitor 214 tells the operator where he or she should put that look ahead lite. This is typically in the form of a cart slot number at the cutting station.

The next priority lite added to a Low Yield Sheet is a filler lite F. Filler lites are certain sizes and glass types that are commonly used in production. The system adds filler lites to Low Yield Sheets to increase yield. They are stored in close proximity to the cutting table. The number of filler lites needed is noted on the display. (See FIG. 16) As the number of filler lites that have been cut increases, the corresponding number of filler lites that are needed decreases and the video display will be updated until the desired number of filler lites has been cut. When a production batch calls for a lite with the size and glass type of a filler lite, an appropriate filler lite can be quickly retrieved from the storage area. Although the depictions of FIGS. 9–15 suggest that the controller places lites of a similar nature together on the glass sheet, the controller may rearrange the lites on a pattern to increase yield and may for example intersperse lites of different types next each other on the glass sheet.

The next priority added to a Low Yield Sheet is a temporary lite T. A temporary lite is designated as a lite to be stored in a temporary cart until a cart for it's production batch has been placed at the cutting table in the positions illustrated in FIG. 7 by carts 250, 251, 252, or 253.

The next priority added to a Low Yield Sheet is a remnant R. A remnant is designated as the remaining area of the large stock glass sheet that can be stored and used later in the optimization process. The invention will instruct the cutting table if and how to cut the remnant for easier storage and store the position and size information of the remnant for subsequent optimization.

Figure 16A:
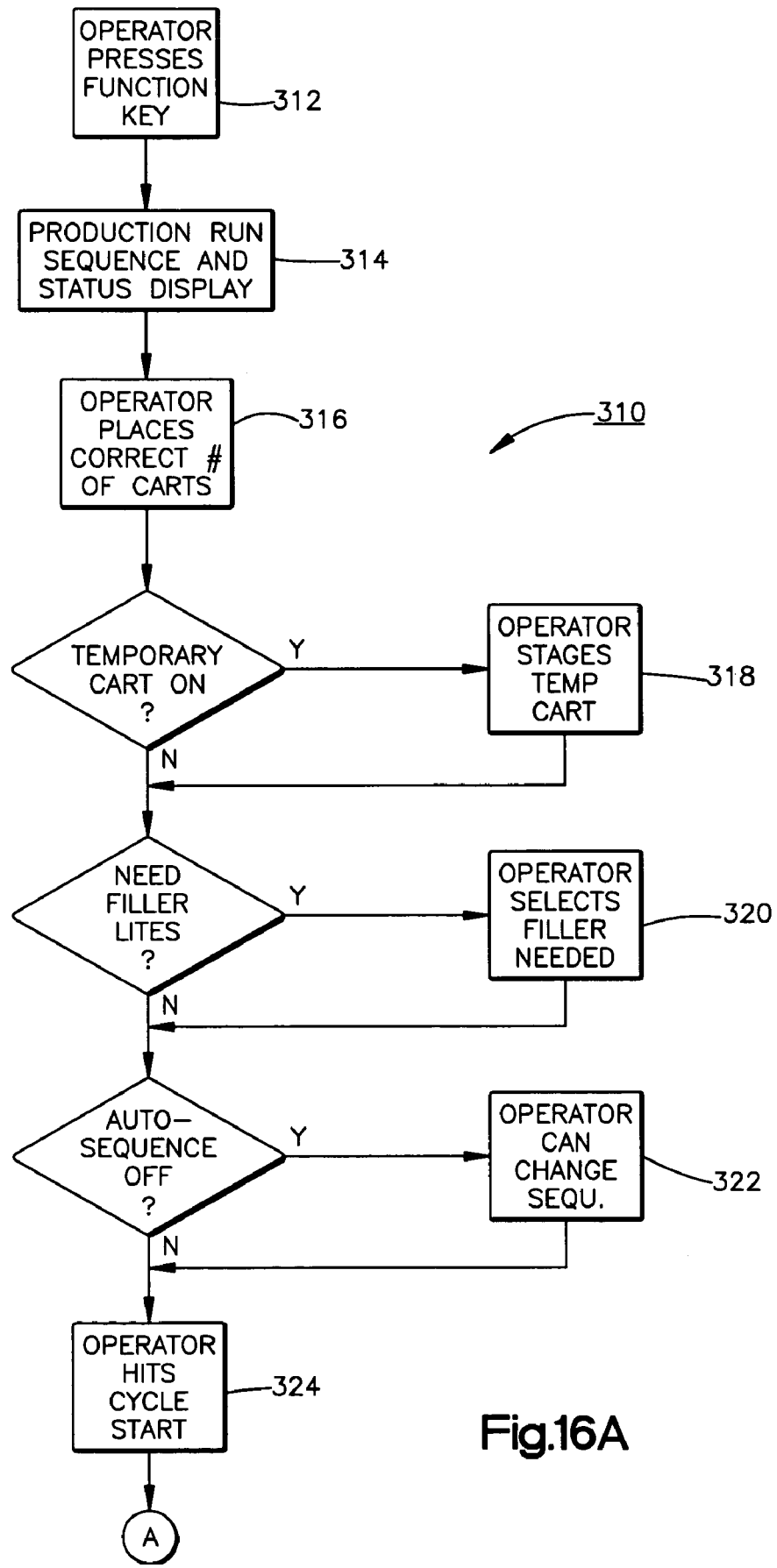
FIGS. 16A and 16B are flowcharts for optimizing lite layouts on glass sheets of a production run.
Figure 16B:
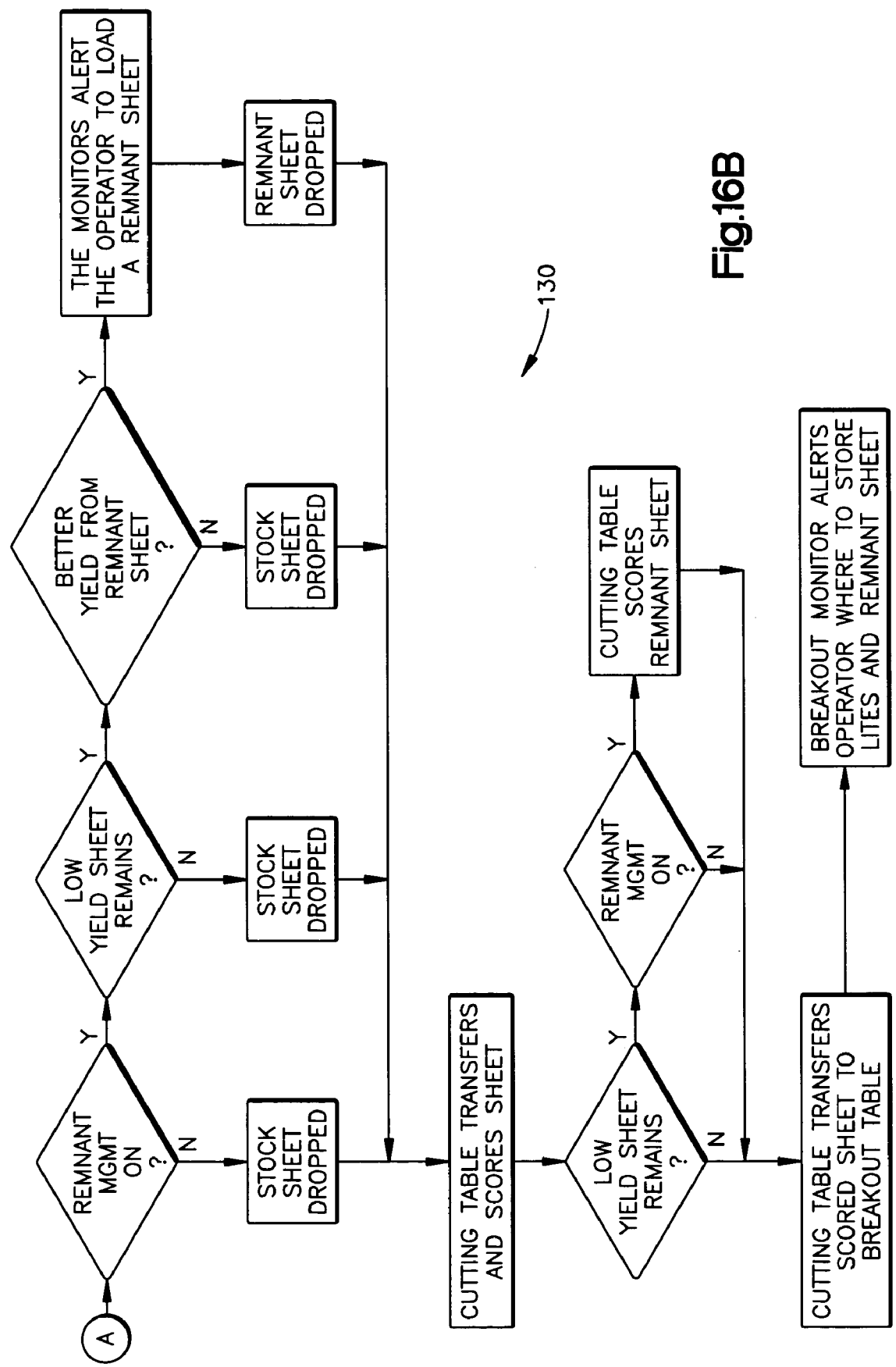

During the glass optimization process 310 (which takes place prior to cutting) depicted in the flow chart of FIGS. 16A and 16B, the controller optimizes glass usage to reduce waste during glass cutting utilizing the sequence of priorities. The invention may also heuristically change the sequence of priorities based on input gathered via a computer network from other machines or programmable devices.

Figure 8:
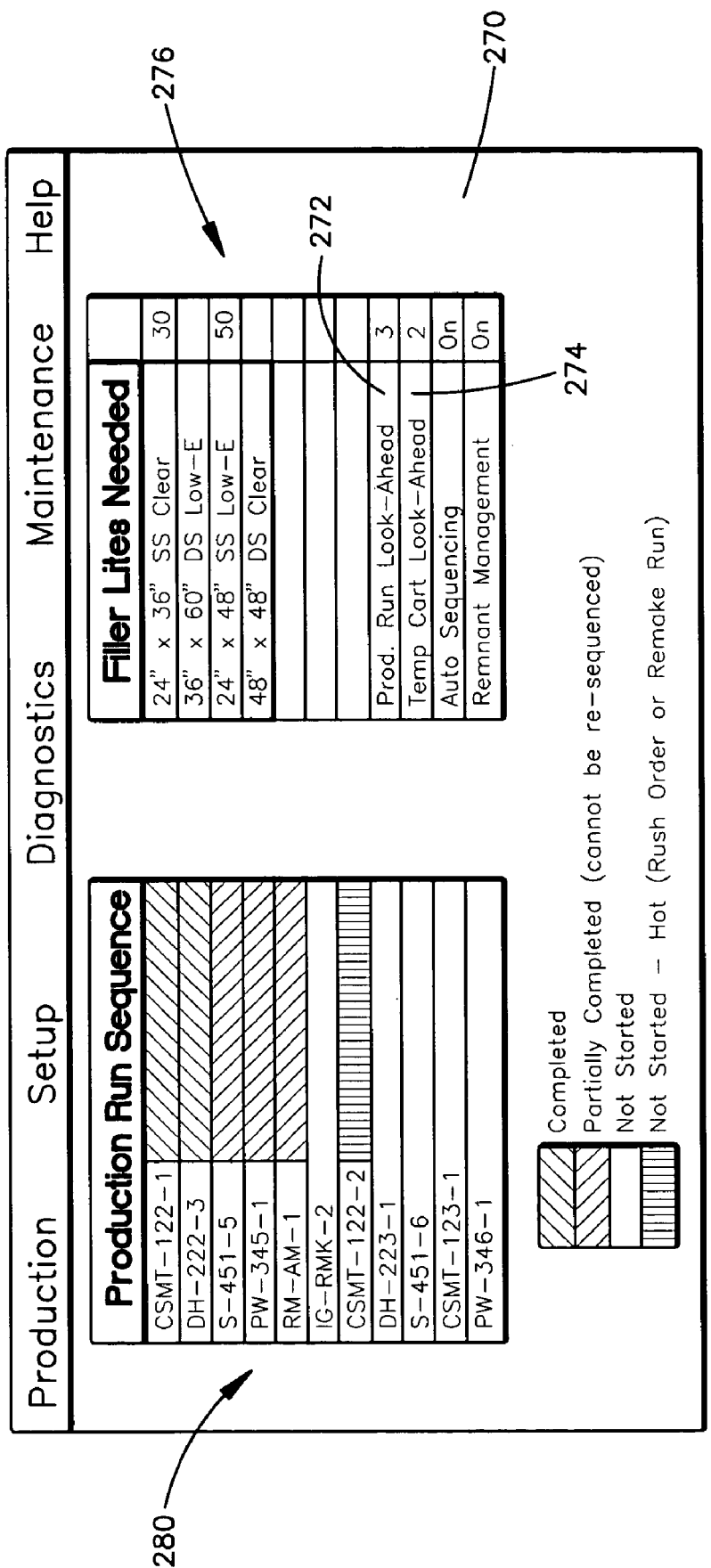
FIG. 8 is a schematic of a user interface by means of which an operator sets up cutting operations at the FIG. 1 cutting station.

The cutting table operator presses 312 a function key on the controller. The controller responds by displaying 314 a graphical display 270 similar to FIG. 8. Listed on the display 270 is a Production Run Look-Ahead Parameter 272. This parameter corresponds to how many production batches the controller will look-ahead for lites to increase the yield on Low Yield Sheets. The yield (as a percentage) that the controller uses to determine a Low Yield Sheet is entered during the initial setup of the invention. Each production run typically corresponds to one cart. Therefore, if the Production Run Look-Ahead parameter displays the number '3', the operator knows to place 316 three carts 250, 251, 252 around the cutting table.

The display 270 (FIG. 8) also includes a Temporary Cart Look-Ahead Parameter 274. If a number other than 0 is displayed, the operator places 318 a temporary cart or carts (cart 253 for example) at the cutting table. The displayed parameter indicates the number of additional production runs (in addition to the production run look ahead) to be checked with the look-ahead function. Assuming the temporary cart look ahead is other than zero, the Breakout Monitor will display which slot in the temporary cart the operator should place the lites identified from those production batches. In a typical application there is only one temporary cart for storing lites from multiple additional batches. When those additional batches are cut, the operator is prompted to move an already cut lite from its slot in the temporary cart and moved to its appropriate (and now in place) production run cart location or slot.

The operator views the Filler Lites Needed table 276 and enters the desired number of filler lites. Whenever possible, the invention adds the sizes of filler requested to Low Yield Sheet until the requested amount of filler lites is satisfied.

The operator views the Auto Sequencing Parameter. If "off", the operator cannot change the order of the production batches in the queue. The order of the production batches will be determined by external software. If "on", the operator may rearrange 322 the order of any production batches not started. Color coding of the display of FIG. 2 indicates which production batches in a list 280 are not started.

The operator then presses 324 the cycle start button. The cutting table will begin the next production run in the queue. The invention automatically identifies Low Yield Sheets and will calculate how to get the best yield. The sequence of steps 330 depicted in FIG. 16B inform the operator which type of sheet to drop on the cutting table. The invention will follow a user-defined sequence of priorities to determine how to increase the yield by adding lites to the Low Yield Sheet from different sources. The invention adds lites from MDI (manual data input), local remake entry, future production runs and standard sizes (filler lites). The invention may also heuristically change the sequence of priorities based on input gathered via a computer network from other machines or programmable devices. If any Low Yield Sheets remain and the Remnant Management Parameter is "on", the invention will determine if the lites on the low yield sheet can more efficiently fit on a stored remnant sheet in a manner that eliminates the low yield condition. If so, the controller and breakout monitor alert the operator to load the corresponding stored remnant sheet from a remnant storage and retrieval system 45 having a cart for storing remnant sheets. The size and configuration of the Remnant Sheet Queue will be entered during the initial setup of the invention.

After the cutting table scores the sheet and it remains a Low Yield Sheets and the Remnant Management Parameter is "on" and there is room to store another remnant sheet on the remnant sheet cart, the system scores the largest rectangle possible in the unused area of the Low Yield Pattern. Via the breakout monitor, the system alerts the operator to transfer the remnant sheet to a manual, semi-automatic or automatic remnant storage and retrieval system 245. The breakout monitor also indicates which cart and slot (standard or temporary cart) to place each lite via text and color coding.

The operator presses another function key at the cutting table controller to return to the previous screen.

The invention also tracks and reports yield, throughput and filler lite information in real-time to the cutting table display as well as other computers, computer-controlled devices and computer software.

Although an exemplary embodiment of the invention has been described with a degree of particularity, it is the intent that the invention include all modifications and alterations from the disclosed design falling within the spirit or scope of the appended claims.

The invention claimed is:

1. A method of controlling production run sequences of insulating glass units, comprising:
   a) scheduling a sequence of runs of insulating glass units to be produced for assembly to form a window or door at a plurality of glazing lines;
   b) monitoring a status of said sequence of runs on a production control workstation;
   c) monitoring a status of one or more computer controlled insulating glass unit component processing machines on the production control workstation by means of electronic communication between the processing machines and said production control workstation;
   d) monitoring a queue of insulating glass units from the insulating glass component processing machines to be assembled to a window or door at the glazing lines and indicating a status of the queue on a visual display at the production control workstation;
   e) providing a user actuated input at the production control workstation for adjusting production by the processing machines; and
   f) altering production within the sequence of runs in response to the user actuated input at the production control workstation based on one of the status of the runs, the status of the one or more insulating glass unit component processing machines, and the queue of insulating glass units at the glazing lines.

2. The method of claim 1 further comprising monitoring electronic requests to prioritize a given run of insulating glass units at the production control workstation and altering the sequence of runs based on the request to prioritize the given run.

3. The method of claim 1 further comprising electronically communicating an altered sequence of runs to the one or more glass component processing machines.

4. A method of controlling production run sequences of insulating glass units, comprising:
   a) scheduling a sequence of runs of insulating glass components to be produced for assembly into insulating glass units at an assembly station;
   b) monitoring a status of one or more insulating glass component processing machines;
   c) electronically communicating the status of the one or more insulating glass component processing machines to a production control workstation;
   d) determining a status of runs of insulating glass components produced by the one or more insulating glass component processing machines from the electronically communicated status of the processing machines and indicating a status of said runs on a visual display;
   e) providing a user actuated input for altering the sequence of runs of insulating glass components based on a monitored status of the runs of insulating glass components; and
   f) altering the sequence of runs based on the user actuated input.

5. The method of claim 4 further comprising monitoring electronic requests to prioritize a given run of insulating glass components at the production control workstation and altering the sequence of runs based on the request to prioritize the given run.

6. The method of claim 4 further comprising electronically communicating an altered sequence of runs to the one or more glass component processing machines.

7. A method of controlling production run sequences for producing insulating glass units, comprising:
   a) scheduling a sequence of runs of insulating glass units to be produced for assembly into a window or a door upon reaching one glazing line of at a plurality of glazing lines;
   b) monitoring a number of runs of assembled insulating glass units in queue to be assembled into a window or a door sash at the plurality of glazing lines;
   c) identifying a low queue condition corresponding to a shortage of assembled insulating glass units at an identified glazing line;
   d) electronically communicating the low queue condition of the identified glazing line to a production control workstation and displaying said low queue condition on a visual display at the production control workstation; and
   e) altering the sequence of runs of insulating glass units to add assembled insulating glass units at the identified glazing line in response to a user input at the production control workstation.

8. The method of claim 7 wherein a low queue condition is automatically identified when the number of runs in queue at the given glazing line reaches a predetermined queue lower limit.

9. The method of claim 7 wherein a low queue condition is manually identified and entered into a programmable device by a glazing line worker.

10. The method of claim 7 wherein the number of runs of assembled insulating glass units in queue to be assembled into a window or door at the glazing lines is monitored by identifying runs of assembled insulating glass units that are delivered to each glazing line and identifying runs of assembled insulating glass units that are processed at each glazing line.

11. The method of claim 10 wherein the runs of assembled insulating glass units that are delivered to each glazing line and runs of assembled insulating glass units that are processed at each glazing line are identified by scanning an identification label.

12. The method of claim 7 further comprising highlighting a next available run of insulating glass units on the visual display that can be produced for the identified glazing line on the production control workstation.

13. The method of claim 12 wherein the sequence of runs is altered by prioritizing a highlighted next available run for the given glazing line at the production control workstation.

14. The method of claim 7 wherein the sequence of runs is altered by prioritizing a next available run for the given glazing line when there is a low queue condition at the identified glazing line.

15. The method of claim 7 further comprising tracking a number of low queue conditions at each glazing line and adjusting a predetermined queue lower limit based on the tracked number of low queue conditions.

16. The method of claim 7 further comprising prioritizing a run of insulating glass units required by the identified glazing line, electronically communicating the prioritized run from the given glazing line to the production control workstation, and altering the sequence of runs to produce the prioritized run of insulating glass units earlier in time.

17. The method of claim 7 further comprising preventing a sequence of production runs in progress from being altered.

18. A method of controlling production run sequences of insulating glass units, comprising:
   a) creating a sequence of runs of insulating glass units to be produced for assembly into a window or door at a plurality of glazing lines;
   b) identifying a low queue condition of insulating glass units at an identified glazing line and electronically communicating the low queue condition of the identified glazing line to a production control workstation,
   c) automatically prioritizing a run of insulating glass units required to increase a queue of insulating glass units at the identified glazing line; and
   d) altering the sequence of runs to produce the prioritized run of insulating glass units earlier in time.

19. The method of claim 18 further comprising altering the sequence of runs to resolve the low queue condition at the identified glazing line.

20. A system for controlling production run sequences of insulating glass units, comprising:
   a) insulating glass component processing machines for producing assembled insulating glass units; and
   b) one or more controller or ancillary computers including a programmable device in communication with the insulating glass component processing machines for:
      i) creating a sequence of runs of insulating glass components to be produced for assembly into insulating glass units at an assembly station;
      ii) monitoring a status of one or more insulating glass component processing machines;
      iii) electronically communicating a status of the insulating glass component processing machines to a production control workstation;
      displaying a status of the insulating glass component processing machines on a visual display at the production control workstation; and
      iv) providing a user actuated input at the production control workstation for altering the sequence of runs based on the status of the insulating glass component processing machines.

21. A system for controlling production run sequences of insulating glass units, comprising:
   a) window component processing stations for producing assembled insulating glass units;
   b) a plurality of glazing lines where assembled insulating glass units are assembled into a window or door; and
   c) one or more controller or ancillary computers including a programmable device in communication with the window component processing stations and the plurality of glazing lines for:
      i) creating a sequence of runs of insulating glass units to be produced into assembled insulating glass units for assembly to window or door sash at the plurality of glazing lines;
      ii) monitoring a number of runs of assembled insulating glass units in queue to be assembled to window or door sash at a given glazing line of the plurality of glazing lines;
      iii) identifying a low queue condition at an identified glazing line;
      iv) highlighting a next available run of insulating glass units that can be produced for the identified glazing line on the production control workstation; and
      iv) altering the sequence of runs to produce assembled insulating glass units in the next available run for routing to the identified glazing line.

22. The system of claim 21 wherein a low queue condition is identified when the number of runs in queue at the given glazing line reaches a predetermined queue lower limit.

23. The system of claim 21 wherein the number of runs of assembled insulating glass units in queue to be assembled to window or door sash at the given glazing line is monitored by identifying runs of assembled insulating glass units that are delivered to the given glazing line and identifying runs of assembled insulating glass units that are processed at the given glazing line.

24. The system of claim 21 wherein the one or more controller or ancillary device alters the sequence of runs by prioritizing the next available run for the identified glazing line when there is a low queue condition at the identified glazing line.

25. A system for controlling production run sequences of insulating glass units, comprising:
   a) window component processing stations for producing assembled insulating glass units;
   b) a plurality of glazing lines where assembled insulating glass units are assembled into a window or door; and
   c) one or more controller or ancillary computers including a programmable device in communication with the window component processing stations and the plurality of glazing lines for:
      i) creating a sequence of runs of insulating glass units to be produced for assembly to window or door sash at a plurality of glazing lines;
      ii) identifying when a number of runs of assembled insulating glass units in queue at an identified glazing line reaches a predetermined queue lower limit and prioritizing a run of insulating glass units required by the identified glazing line;

iii) altering the sequence of runs to produce the prioritized run of insulating glass units earlier in time.

26. The system of claim 25 wherein the prioritized run is one of a rush run and a remake run.

27. A computer readable medium for storing instructions for performing a method of controlling production run sequences of insulating glass units, the method comprising:
   a) scheduling a sequence of runs of insulating glass units to be produced for assembly to window or door at one of a plurality of glazing lines;
   b) monitoring a status of said sequence of runs on a production control workstation;
   c) monitoring a status of one or more computer controlled insulating glass component processing machines at the production control workstation by means of electronic communication between the processing machines and said production control workstation;
   d) monitoring a queue of insulating glass units to be assembled into a window or door at the glazing lines and indicating a status of the queue on a visual display of the production control workstation;
   e) providing a user actuated input at the production control workstation for adjusting the production by the processing machines and
   f) altering production within the sequence of runs in response to the user actuated input at the production control workstation based on one of the status of the runs, the status of the one or more insulating glass unit component processing machines, and the queue of insulating glass units at the glazing line.

28. A computer readable medium for storing instructions for performing a method of controlling production run sequences of insulating glass units, the method comprising:
   a) scheduling a sequence of runs of insulating glass components to be produced for assembly into insulating glass units at an assembly station;
   b) monitoring a status of one or more insulating glass component processing machines;
   c) electronically communicating the insulating glass component processing machines to a production control workstation;
   d) determining a status of runs of insulating glass components produced by the one or more insulating glass component processing machines from the electronically communicated status of the processing machines and indicating status of said runs on a visual display;
   e) providing a user actuated input for altering the sequence of runs of insulating glass components based on a monitored status of the runs of insulating glass components; and
   f) altering the sequence of runs based on the user actuated input.

29. A computer readable medium for storing instructions for performing a method of controlling production run sequences of insulating glass units, the method comprising:
   a) scheduling a sequence of runs of insulating glass units to be produced for assembly into a window or a door at a plurality of glazing lines;
   b) monitoring a number of runs of assembled insulating glass units in queue to be assembled into a window or door sash at the plurality of glazing lines;
   c) identifying a low queue condition corresponding to a shortage of insulating glass units at an identified glazing line;
   d) electronically communicating the low queue condition of the identified glazing line to a production control workstation and displaying said low queue condition on a visual display at the production control workstation; and
   e) altering the sequence of runs of insulating glass units to add insulating glass units at the identified glazing line in response to a user input at the production control workstation.

30. The computer readable medium of claim 29 wherein the number of runs of assembled insulating glass units in queue to be assembled to window or door sash at the identified glazing line is monitored by identifying runs of assembled insulating glass units that are delivered to each glazing line and identifying runs of assembled insulating glass units that are processed at each glazing line.

31. The computer readable medium of claim 29 further comprising highlighting a next available run of insulating glass units that can be produced for the identified glazing line on the production control workstation.

32. The computer readable medium of claim 29 wherein the method further comprises tracking a number of low queue conditions at the plurality of glazing lines and adjusting a predetermined queue lower limit based on the tracked number of low queue conditions.

33. The computer readable medium of claim 29 wherein the method further comprises prioritizing a run of insulating glass units required by the identified glazing line, electronically communicating the prioritized run from the given glazing line to the production control workstation, and altering the sequence of runs to produce the prioritized run of insulating glass units earlier in time.

34. The computer readable medium of claim 29 herein the method further comprises preventing a sequence of production runs in progress from being altered.

35. A computer readable medium for storing instructions for performing a method of controlling production run sequences of insulating glass units, the method comprising:
   a) creating a sequence of runs of insulating glass units to be produced for assembly into a window or door at a plurality of glazing lines;
   b) identifying a low queue condition of insulating glass units at an identified glazing line and electronically communicating the low queue condition of the identified glazing line to a production control workstation;
   c) automatically prioritizing a run of insulating glass units required to increase a queue of insulating glass units at the identified glazing line; and
   d) altering the sequence of runs to produce the prioritized run of insulating glass units earlier in time.

36. The computer readable medium of claim 35 wherein the method further comprises altering the sequence of runs to resolve the low queue condition at the identified glazing line.

37. A method of controlling production run sequences of insulating glass units, comprising:
   a) scheduling a sequence of runs of insulating glass components to be produced for assembly into insulating glass units at an assembly station;
   b) monitoring a number of runs of completed insulating glass components in queue to be assembled into insulating glass units at the assembly station;
   c) identifying a low queue condition corresponding to a shortage of insulating glass components of a given type at the assembly station;

d) electronically communicating the low queue condition of the given type of insulating glass component to a production control workstation and displaying said low queue condition on a visual display at the production control workstation; and e) providing a user input for altering the sequence of runs to resolve the low queue condition of the given type of insulating glass component at the assembly station.

* * * * *